May 6, 1924.
G. A. WOOD
HAND TOOL
Filed Oct. 30, 1922
1,493,176
Fig. 1.
Fig. 2.
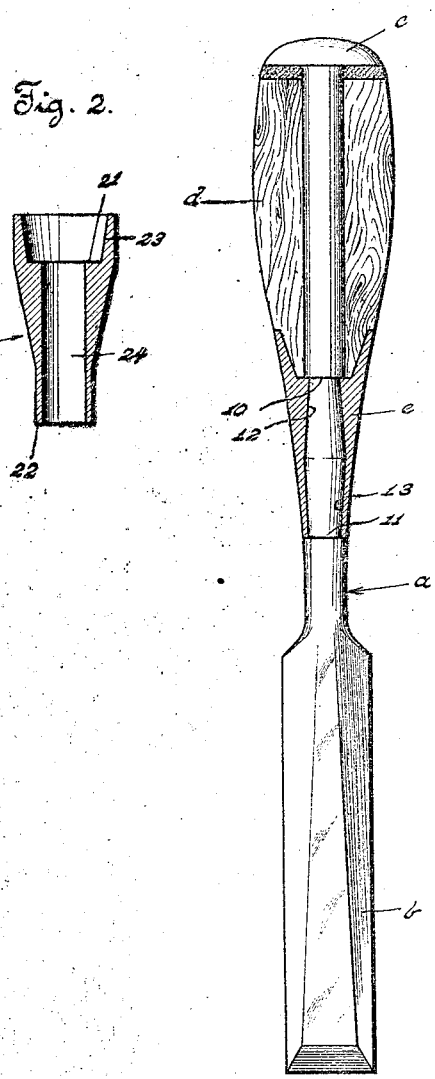
Fig. 3
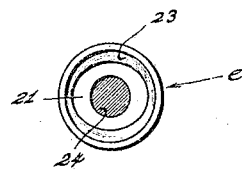
Inventor
George A. Wood
By T. Clay Lindsey
Attorney Patented May 6, 1924.

1,493,176

UNITED STATES PATENT OFFICE.

GEORGE A. WOOD, OF SOUTHINGTON, CONNECTICUT, ASSIGNOR TO THE STANLEY WORKS, OF NEW BRITAIN, CONNECTICUT, A CORPORATION OF CONNECTICUT.

HAND TOOL.

Application filed October 30, 1922. Serial No. 597,800.

*To all whom it may concern:*

Be it known that I, GEORGE A. WOOD, a citizen of the United States, and a resident of Southington, county of Hartford, and State of Connecticut, have invented certain new and useful Improvements in Hand Tools, of which the following is a specification.

The invention relates generally to hand tools of the sort having a shank and a handle secured thereon. In the present illustrative disclosure I have shown, by way of exemplification, my improvements incorporated in a chisel to which use they are particularly adapted, but it is to be understood that the invention is capable of use in tools other than chisels, for example, in screw drivers.

The aim of the invention is to provide a tool of this sort having features of novelty and advantage, and more particularly wherein the ferrule into which one end of the handle fits, is more effectively secured or locked against displacement on the tool shank.

In the accompanying drawing, wherein I have disclosed for illustrative purposes one embodiment which the invention may take, Figure 1 is a longitudinal sectional view through my improved chisel;

Fig. 2 is a view in longitudinal section of the ferrule before its assembly on the tool shank; and Fig. 3 is an end view of the ferrule with the shank in section.

Referring to the drawings in detail, $a$ designates the suitably formed metal shank of the tool, in the present instance one end thereof being fashioned to constitute a chisel blade $b$, and the other end being upset to form a head $c$ against which the outer end of the handle $d$ abuts. By way of example, the shank, blade and head are shown as formed integral from a single piece of round stock, but so far as the present invention is concerned the head may be formed separately or the general construction may be otherwise modified to suit requirements.

In accordance with the present invention the shank $a$ and ferrule $e$ are so constructed and assembled that they are securely locked together, making it practically impossible for them to become loose, no matter to what hard usage the tool may be subjected. The shank $a$ has a pair of opposed shoulders 10, 11. The opposite ends 12, 13, of the portion of the shank between the shoulders 10, 11, are respectively tapered down towards these shoulders. In one manner of speaking the shank has a pair of spaced grooves, one having the radially extending wall 10 and the inclined wall 12, and the other the walls 11 and 13.

The ferrule $e$ has a sleeve or bolster portion provided with shoulders 21 and 22 at its opposite ends, and a socket portion 23, the recess of which is preferably tapered to closely receive the correspondingly tapered end of the handle $d$. As formed, the sleeve portion has a through bore or opening 24 of uniform diameter, and the upper and lower ends of the ferrule are cylindrical while its central portion is tapered, as shown.

To assemble the formed ferrule on the shank, the latter is slipped into the bore 24, and the ferrule then pressed or contracted against the shank, as shown in Fig. 1, with the wall of the bore conforming to and contacting against the oppositely tapered portions 12 and 13 of the shank, and the respective shoulders 21 and 22 of the ferrule abutting against the shoulders 10 and 11 of the shank. When the ferrule is thus contracted it is brought into a gradual tapering shape, presenting a smooth grip and a graceful appearance. Preferably the socket of the ferrule is pressed into a slightly non-circular shape, in the present instance into elliptical cross-section, so as to prevent relative turning movement between the ferrule and the handle.

It is, of course, obvious that my invention is susceptible of various modifications and changes which are within the spirit of the invention without departing from the scope of the following claims, it being understood that the present disclosure of my invention is by way of illustration only and it is not to be taken as restrictive of my conception.

I claim as my invention:

1. A hand tool having a shank provided with a pair of longitudinally spaced apart shoulders, and a ferrule contracted about said shank and having shoulders respectively abutting said first shoulders.

2. A hand tool having a handle, a shank provided with a pair of spaced apart and radially extending shoulders, and a ferrule having a sleeve portion contracted about said shank and provided with shoulders at its ends abutting against said first shoulders, said ferrule having a socket portion at one end adapted to receive one end of said handle.

3. A hand tool having a handle, a shank provided with a pair of opposed shoulders, the portion of said shank between said shoulders being tapered down towards its ends, and a ferrule contracted about said portion of said shank and having shoulders respectively abutting against said shoulders on said shank, said ferrule having at one end a tapered socket into which one end of said handle fits.

4. A hand tool having a handle, a round shank provided with a pair of opposed shoulders and a portion between said shoulders tapering down towards its opposite ends, and a ferrule having a sleeve contracted about said portion of said shank and engaging at its ends against said shoulders, said ferrule having a socket portion at its upper end into which said handle is fitted, said ferrule gradually and uniformly tapering down from said handle to said shank.

5. A hand tool having a handle, a round shank provided with a pair of spaced portions of reduced diameter and circular in cross section, and a ferrule having a sleeve portion provided with an opening receiving said shank, said ferrule being contracted into said reduced portions of said shank, and the opening in said ferrule being circular in cross section throughout its length, said ferrule also having an elliptical socket at one end embracing said handle.

6. A hand tool having a handle, a shank provided with a pair of opposed shoulders extending entirely around the shank, the portion of said shank between said shoulders being tapered down towards its ends and being circular in cross section, and a ferrule contracted about said portion of said shank and having circular shoulders respectively abutting against said shoulders on said shank, said ferrule having at one end an integral tapered socket into which one end of said handle fits.

7. The method of constructing the herein-described tool which consists in forming on a length of round stock constituting a shank a pair of opposed shoulders and tapering the portion of the stock between said shoulders down towards its opposite ends, forming a ferrule having a sleeve of substantially the same length as the distance between the shoulders on said shank and a tapered socket at one end, slipping the ferrule onto the shank at the reduced portion thereof, and then contracting said sleeve to bring the shoulders thereof into engagement with the respective shoulders on said shank without changing the cross sectional shape of the shank.

8. The method of constructing the herein-described tool which consists in forming on a length of round stock constituting a shank a portion circular in cross section and tapered down towards its opposite ends, forming a ferrule of less hard material with a sleeve and a tapered socket, said ferrule being formed with a cylindrical portion at each end and an intermediate tapered portion, slipping the ferrule onto the shank at the tapered portion thereof, and then contracting said sleeve tightly against said tapered portion of said shank and externally bringing said ferrule to uniform tapered condition throughout its length without changing the cross and longitudinal sections of said tapered portion.

GEORGE A. WOOD.